B. SANFORD.
CAR-STARTER.

No. 175,764. Patented April 4, 1876.

Witness
Horace Harris
J. C. Tunbridge

Inventor
Benjamin Sanford.

N. PETERS, PHOTO-LITHOGRAPHER, WASHINGTON, D. C.

UNITED STATES PATENT OFFICE.

BENJAMIN SANFORD, OF NEWARK, NEW JERSEY.

IMPROVEMENT IN CAR-STARTERS.

Specification forming part of Letters Patent No. 175,764, dated April 4, 1876; application filed January 8, 1876.

*To all whom it may concern:*

Be it known that I, BENJAMIN SANFORD, of Newark, in the county of Essex and State of New Jersey, have invented a certain Improvement in Car-Starters, of which the following is a specification:

My invention consists in the apparatus combining the lever, ratchet, and pawl, operated by the team in starting a car.

Figure 1:
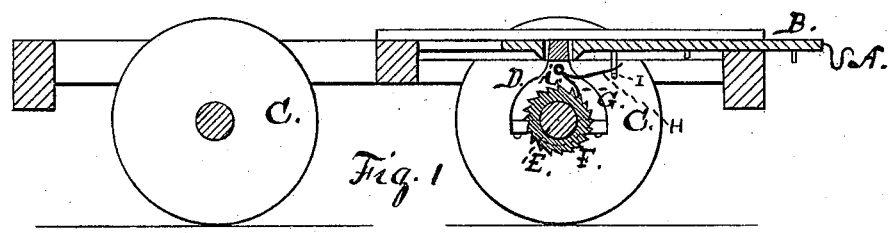
Figure 2:
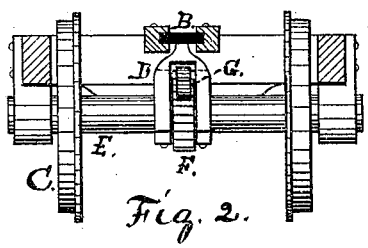

Figure 1 is a longitudinal section. Fig. 2 is a cross-section.

The hook A, to which the team is hitched, is attached to a sliding bar, B, which is located in the frame on a level with the top of the wheels C. To the rear end of this bar is jointed the upper end of a divided lever, D, which, in the two parts of it below, is connected loosely with the car-axle E. Between the parts of this divided lever, and made fast to the axle, is a ratchet-wheel, F, and between the same, and above the ratchet, is a drop-pawl, G, hung on a pin, $i$, near the upper end of the lever.

The draft-bar is connected in any suitable manner with the brake for the wheels, and when the brake is applied in stopping a car this bar is thrown back, so that the pawl rests over the ratchet; but when the draft is again applied in starting the team the pawl catches into the ratchet, and the action of the lever, by the forward movement of the bar, applies an added force to the axle, and assists in starting the car; but after the first action in stating the car the arm H of the pawl, sliding in the loop I, lifts the pawl out of its connection with the ratchet, and the wheels roll on.

The leverage on the axle in starting a car is from the periphery of the wheel, which adds largely to the working power of the lever in assisting to start a car.

I claim—

In a car-starter, the combination of the draft-bar B, lever D, pawl G, arm H, and loop I, with the ratchet F, substantially as and for the purposes specified.

BENJAMIN SANFORD.

Witnesses:
 HORACE HARRIS,
 J. C. TUNBRIDGE.